(12) United States Patent
Knighton et al.

(10) Patent No.: US 9,235,270 B2
(45) Date of Patent: Jan. 12, 2016

(54) MULTI-TOUCH MECHANICAL-CAPACITIVE HYBRID KEYBOARD

(71) Applicants: Mark S. Knighton, Santa Monica, CA (US); Peter J. DeLaurentis, Burlingame, CA (US); Mydul R. Islam, Van Nuys, CA (US)

(72) Inventors: Mark S. Knighton, Santa Monica, CA (US); Peter J. DeLaurentis, Burlingame, CA (US); Mydul R. Islam, Van Nuys, CA (US)

(73) Assignee: Synerdyne Corporation, Santa Monica, CA (US)

( * ) Notice: Subject to any disclaimer, the term of this patent is extended or adjusted under 35 U.S.C. 154(b) by 0 days.

(21) Appl. No.: 13/778,016

(22) Filed: Feb. 26, 2013

(65) Prior Publication Data

US 2014/0241780 A1     Aug. 28, 2014

(51) Int. Cl.
*G06F 3/02* (2006.01)
*G06F 3/023* (2006.01)
*G06F 1/16* (2006.01)

(52) U.S. Cl.
CPC ............ *G06F 3/0205* (2013.01); *G06F 1/1664* (2013.01); *G06F 3/02* (2013.01); *G06F 3/0216* (2013.01); *G06F 3/0233* (2013.01); *H01H 2217/012* (2013.01)

(58) Field of Classification Search
CPC ....... G06F 3/02; G06F 3/0216; G06F 3/0233; G06F 3/0234; G06F 3/0235; G06F 1/1664; H01H 2217/012
USPC ............... 341/20–35; 400/485, 486, 487, 489
See application file for complete search history.

(56) References Cited

U.S. PATENT DOCUMENTS

| | | |
|---|---|---|
| 1,652,464 A | 12/1927 | Tyberg |
| 2,532,228 A | 11/1950 | Hesh |
| 3,399,287 A | 8/1968 | Euler |
| 3,633,724 A | 1/1972 | Samuel |
| 4,201,489 A | 5/1980 | Zapp |
| 4,256,931 A | 3/1981 | Palisek |
| 4,440,515 A | 4/1984 | Nassimbene |
| 4,449,839 A | 5/1984 | Bleuer |
| 4,536,625 A | 8/1985 | Bebie |
| 4,584,443 A | 4/1986 | Yaeger |

(Continued)

FOREIGN PATENT DOCUMENTS

| | | |
|---|---|---|
| CN | 202553446 | 11/2012 |
| EP | 1223501 | 7/2002 |

(Continued)

OTHER PUBLICATIONS

*USRobotics keyboard 5502. Model 5502 Mini Bluetooth Keyboard*, USRobotics data sheet, (Aug. 24, 2011).
*USRobotics Introduces New Tablet Accessories*, Worldwide Computer Product News, Normans Media Ltd., Gale, Cengage Learning, (Sep. 9, 2011).
Synerdyne Corporation, International Search Report and Written Opinion, PCT Appln No. PCT/US 2013/023793, dated May 7, 2013.
International Search Report in PCT/US2014/018407 dated Jul. 10, 2014. 2 pages.

(Continued)

*Primary Examiner* — Hai Phan
*Assistant Examiner* — Franklin Balseca
(74) *Attorney, Agent, or Firm* — Blakely Sokoloff Taylor & Zafman LLP (57) ABSTRACT

A touch type keyboard with an array of mechanical keys. Each key has a plurality of capacitive sensors to detect a finger's location on the surface of the key. The array provides single strike access to an entire alphabet, while reducing hand motion. The invention overcomes previous conflicts, to combine wide finger-spacing with closer reach to each character. One embodiment also includes cursor control functions embedded within the home row, and layered labeling to improve visual simplicity.

23 Claims, 7 Drawing Sheets

(56) References Cited

U.S. PATENT DOCUMENTS

| | | | |
|---|---|---|---|
| 4,654,647 A | 3/1987 | Wedam | |
| 4,719,455 A | 1/1988 | Louis | |
| 4,761,522 A | 8/1988 | Allen | |
| 4,778,295 A | 10/1988 | Bleuer | |
| 4,896,003 A | 1/1990 | Hsieh | |
| 4,913,573 A | 4/1990 | Retter | |
| 4,935,728 A | 6/1990 | Kley | |
| 4,964,075 A | 10/1990 | Shaver et al. | |
| 5,012,230 A | 4/1991 | Yasuda | |
| 5,017,030 A | 5/1991 | Crews | |
| 5,086,296 A | 2/1992 | Clark | |
| 5,087,910 A | 2/1992 | Guyot-Sionnest | |
| 5,252,952 A | 10/1993 | Frank et al. | |
| 5,383,735 A | 1/1995 | Smiley | |
| 5,424,516 A | 6/1995 | Emmons | |
| 5,424,728 A | 6/1995 | Goldstein | |
| 5,497,151 A | 3/1996 | Dombroski | |
| 5,504,502 A | 4/1996 | Arita et al. | |
| 5,528,235 A | 6/1996 | Lin et al. | |
| 5,564,560 A | 10/1996 | Minelli | |
| 5,644,338 A | 7/1997 | Bowen | |
| 5,661,505 A | 8/1997 | Livits | |
| 5,666,138 A | 9/1997 | Culver | |
| 5,772,008 A | 6/1998 | Yu et al. | |
| 5,790,108 A | 8/1998 | Salcudean et al. | |
| 5,808,603 A | 9/1998 | Chen | |
| 5,818,361 A | 10/1998 | Acevedo | |
| 5,841,374 A | 11/1998 | Abraham | |
| 5,841,635 A | 11/1998 | Sadler et al. | |
| 6,031,469 A | 2/2000 | Dodd | |
| 6,046,754 A | 4/2000 | Stanek | |
| 6,075,522 A | 6/2000 | Milroy | |
| 6,103,979 A | 8/2000 | Motoyama et al. | |
| 6,157,323 A | 12/2000 | Tso et al. | |
| 6,168,331 B1 | 1/2001 | Vann | |
| 6,204,839 B1 | 3/2001 | Mato | |
| 6,230,222 B1 | 5/2001 | Rush | |
| 6,307,537 B1 | 10/2001 | Oowada | |
| 6,307,538 B1 | 10/2001 | Bacon | |
| 6,348,878 B1 | 2/2002 | Tsubai | |
| 6,386,773 B1 | 5/2002 | Mathias | |
| 6,417,838 B1 | 7/2002 | Inamura | |
| 6,437,682 B1 | 8/2002 | Vance | |
| 6,510,048 B2 | 1/2003 | Rubenson et al. | |
| 6,520,699 B2 | 2/2003 | Abe | |
| D473,226 S | 4/2003 | Griffin | |
| 6,542,091 B1* | 4/2003 | Rasanen | 341/22 |
| 6,542,149 B1 | 4/2003 | Chung | |
| 6,594,142 B2 | 7/2003 | Katz | |
| 6,670,873 B2 | 12/2003 | Inada et al. | |
| 6,677,843 B1 | 1/2004 | Monroe et al. | |
| 6,679,639 B2 | 1/2004 | Katz | |
| 6,761,494 B2 | 7/2004 | Hsu et al. | |
| 6,798,649 B1 | 9/2004 | Olodort et al. | |
| 6,839,781 B1 | 1/2005 | Kanazawa | |
| 6,869,239 B2 | 3/2005 | Morris | |
| 6,928,461 B2 | 8/2005 | Tuli | |
| 6,971,147 B2 | 12/2005 | Halstead | |
| 7,075,520 B2* | 7/2006 | Williams | G06F 3/0219 341/22 |
| 7,202,853 B2 | 4/2007 | Ng et al. | |
| 7,218,248 B2* | 5/2007 | Kong et al. | 341/22 |
| 7,307,620 B2* | 12/2007 | Siddeeq | 345/169 |
| 7,310,053 B2 | 12/2007 | Bollman | |
| 7,401,300 B2 | 7/2008 | Nurmi | |
| 7,595,742 B2* | 9/2009 | Cozzi et al. | 341/28 |
| 7,642,886 B2 | 1/2010 | Boss | |
| 7,736,078 B2* | 6/2010 | Webber | 400/489 |
| 7,900,844 B2 | 3/2011 | Alden | |
| 8,079,766 B2* | 12/2011 | Kinney | 400/489 |
| 8,081,092 B2* | 12/2011 | Laufkotter | 341/23 |
| 8,102,647 B2 | 1/2012 | Bhutani et al. | |
| 8,414,207 B1 | 4/2013 | Knighton et al. | |
| 2001/0006587 A1 | 7/2001 | Keinonen et al. | |
| 2002/0027549 A1 | 3/2002 | Hirshberg | |
| 2002/0037715 A1 | 3/2002 | Mauney et al. | |
| 2002/0085337 A1 | 7/2002 | Rubenson et al. | |
| 2002/0138582 A1 | 9/2002 | Chandra et al. | |
| 2002/0149566 A1 | 10/2002 | Sarkissian | |
| 2003/0030542 A1 | 2/2003 | von Hoffman | |
| 2003/0099086 A1 | 5/2003 | Chuang | |
| 2003/0132916 A1 | 7/2003 | Kramer | |
| 2003/0193478 A1 | 10/2003 | Ng et al. | |
| 2003/0197685 A1 | 10/2003 | Yi | |
| 2004/0061683 A1 | 4/2004 | Mochizuki et al. | |
| 2004/0183785 A1 | 9/2004 | Liu et al. | |
| 2004/0190968 A1 | 9/2004 | Yang | |
| 2004/0239533 A1 | 12/2004 | Bollman | |
| 2005/0002158 A1 | 1/2005 | Olodort et al. | |
| 2005/0123333 A1 | 6/2005 | Sugimura et al. | |
| 2005/0140653 A1 | 6/2005 | Pletikosa et al. | |
| 2006/0088356 A1 | 4/2006 | Jawerth et al. | |
| 2006/0159507 A1 | 7/2006 | Jawerth et al. | |
| 2006/0255971 A1 | 11/2006 | Kim et al. | |
| 2006/0274045 A1 | 12/2006 | Stenbroten | |
| 2007/0008291 A1 | 1/2007 | Liu | |
| 2007/0150953 A1 | 6/2007 | Hamid et al. | |
| 2007/0165002 A1 | 7/2007 | Wassingbo | |
| 2007/0172287 A1* | 7/2007 | Hirsch | B41J 5/10 400/489 |
| 2007/0268261 A1 | 11/2007 | Lipson | |
| 2007/0279388 A1 | 12/2007 | Pletikosa et al. | |
| 2007/0290890 A1 | 12/2007 | Chen et al. | |
| 2009/0033628 A1 | 2/2009 | Srivastava | |
| 2009/0222908 A1 | 9/2009 | Warren | |
| 2009/0257807 A1 | 10/2009 | Woloschyn | |
| 2009/0262492 A1* | 10/2009 | Whitchurch et al. | 361/679.08 |
| 2009/0309616 A1 | 12/2009 | Klinghult et al. | |
| 2010/0040400 A1 | 2/2010 | Hirsch | |
| 2010/0055928 A1 | 3/2010 | Randall | |
| 2010/0065454 A1 | 3/2010 | Badillo et al. | |
| 2010/0073302 A1 | 3/2010 | Ritzau et al. | |
| 2010/0073855 A1 | 3/2010 | Liang et al. | |
| 2010/0184378 A1 | 7/2010 | Wakefield | |
| 2010/0222110 A1 | 9/2010 | Kim et al. | |
| 2010/0253629 A1 | 10/2010 | Orsley | |
| 2010/0254111 A1 | 10/2010 | Ligtenberg et al. | |
| 2010/0259482 A1 | 10/2010 | Ball | |
| 2011/0028006 A1 | 2/2011 | Shah et al. | |
| 2011/0031287 A1 | 2/2011 | Le Gette et al. | |
| 2011/0063787 A1* | 3/2011 | Griffin | 361/679.08 |
| 2011/0170250 A1 | 7/2011 | Bhutani et al. | |
| 2011/0223352 A1 | 9/2011 | Chen | |
| 2011/0267278 A1 | 11/2011 | Wickstrom | |
| 2011/0304555 A1 | 12/2011 | Murphy | |
| 2012/0293417 A1 | 11/2012 | Dennis | |

FOREIGN PATENT DOCUMENTS

| | | |
|---|---|---|
| JP | 2003288153 | 10/2003 |
| JP | 2010/226230 | 10/2010 |
| WO | WO-0239701 | 5/2002 |
| WO | WO-02101531 | 12/2002 |
| WO | WO-03007143 | 1/2003 |
| WO | WO-2006/091753 | 8/2006 |

OTHER PUBLICATIONS

Written Opinion of the International Search Authority & International Search Report in PCT/US2014/01320 dated Oct. 30, 2014. 6 pages.

Notice of Allowance in U.S. Appl. No. 13/366,220 dated Sep. 26, 2014. 8 pages.

Non-Final Office Action in U.S. Appl. No. 13/846,448 mailed Nov. 4, 2014. 15 pages.

Non-Final Office Action in U.S. Appl. No. 14/223,167 dated Jun. 22, 2015. 23 pages.

Non-Final Office Action in U.S. Appl. No. 14/153,983 dated May 27, 2015. 7 pages.

* cited by examiner

MULTI-TOUCH MECHANICAL-CAPACITIVE HYBRID KEYBOARD

BACKGROUND

1. Field of the Invention

Embodiments of the invention relate to a keyboard. More specifically, embodiments of the invention relate to a touch type keyboard having cursor control functions embedded in the home row.

2. Background

With the increasing ubiquity of mobile products, reduced sized keyboards are increasingly important. Various manufacturers have provided different types of keyboards, many of which are actually larger than the devices with which they communicate. Many keyboards provide a single layer of functions associated with particular location on the keyboard. As used herein, a "layer" refers to a character and the shift of the character. Thus, capital J and lowercase j are regarded as falling within a single layer as is commonly the case on standard touch-type keyboards. To make keyboards smaller, it can be desirable to overlap functions under the same location on the keyboard. Taken to its extreme, a typical phone keypad allows cycling through letters and symbols using multiple touches to cause the cycling. This however, does not permit efficient entry and does not constitute what is commonly regarded as a touch-typing keyboard. Generally, touch-typing keyboards are constrained by spacing between keys and single touch access to alphabetic characters. Common touch type patterns include QWERTY and AZERTY keyboards. But merely having e.g. a QWERTY pattern does not make a keyboard a touch-type keyboard. International touch typing standard requires spacing between keys to be 19 mm±1 mm. Smaller devices such as netbooks have compressed this limit, but the practical limitation for touch-typing appears to be a key spacing of greater than 14 mm. Most typists would need at least 17 mm spacing to touch type effectively.

In addition to alphanumeric keys, many existing keyboards provide additional keys for popular commonly used functions. Such functions include the cursor keys, that is the up, down, and right and left arrow keys commonly provided as dedicated keys, usually on the right side of the keyboard. Unfortunately, these cursor keys, while popular, occupy valuable real estate where form factor of the keyboard is constrained and increased cost to manufacture these additional structures must be provided. More importantly, these side-located cursor keys cause the user to leave home row frequently, which slows typing.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1:
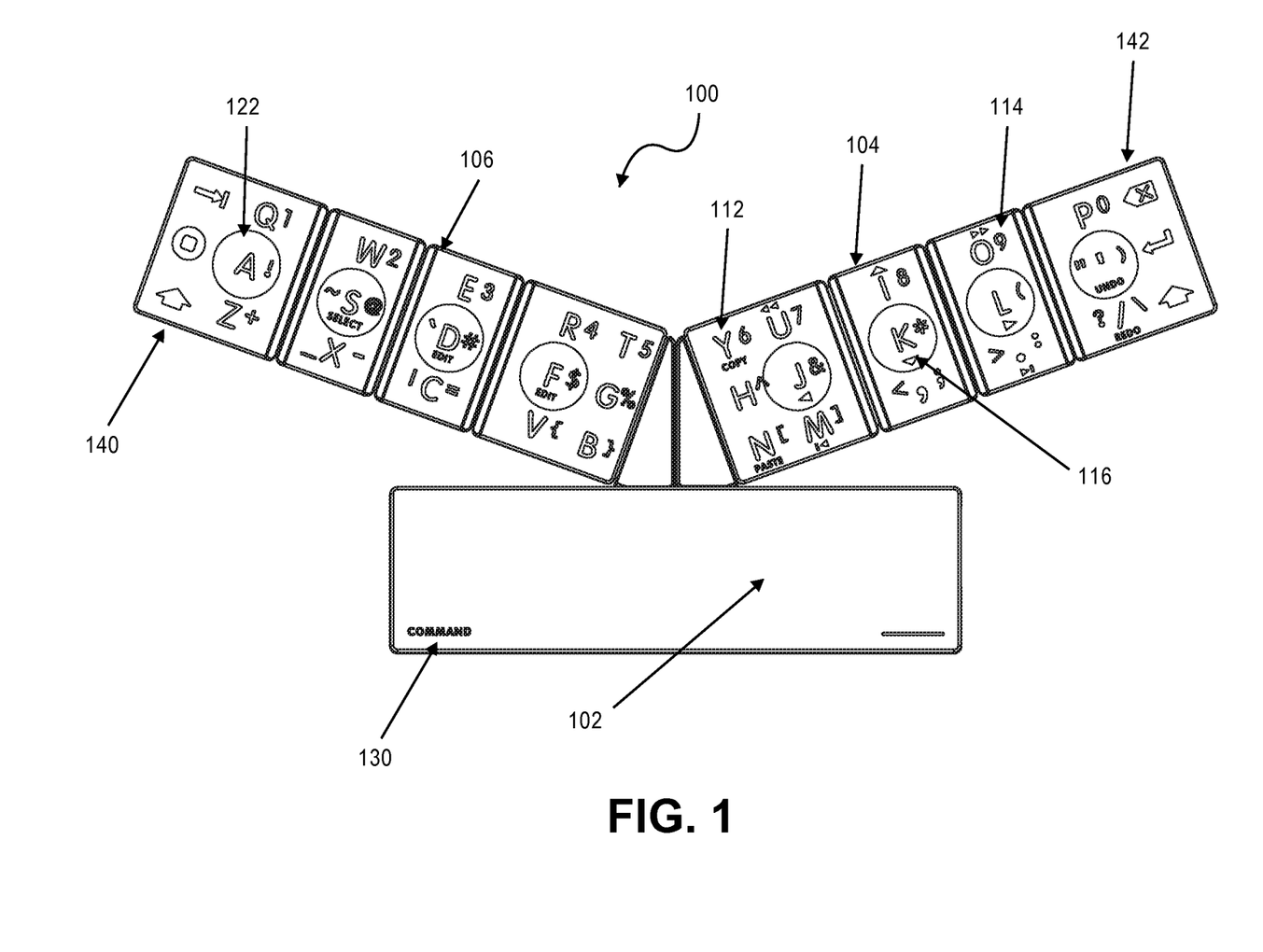
FIG. 1 is a diagram of a compact keyboard of one embodiment of the invention.

FIG. 1 is a diagram of a compact keyboard of one embodiment of the invention. Keyboard 100 may communicate wirelessly with a host device (not shown). In one embodiment, a Bluetooth module within keyboard 100 allows it to communicate with any Bluetooth-enabled device. Thus, embodiments of keyboard 100 may communicate with smartphones, tablets, laptops, desktop computers, etc. A processor within the keyboard interprets key events and transmits them to the host. Other embodiments may be wired to or otherwise physically connected to a host.

Keyboard 100 provides three layers of functions in at least some locations on the keyboard. As used herein "location" refers to both an entire key where the key is mapped to a single character, and a region of a key where a key is mapped to multiple characters, but the region is uniquely mapped to a character. "Uniquely mapped" means that, based on the existing state of the keyboard, actuation of the location unambiguously results in a single character or function. Thus, for example each alpha character on keyboard 100 is uniquely mapped to a location within the first layer 112. Within this patent application, "layer one" is used interchangeably with "first layer," "layer two" with "second layer," and "layer three" with "third layer." In a default state the first layer is active. Explicit details of each layer and the changing of the mode to access the different layers is discussed below.

Figure 2A:
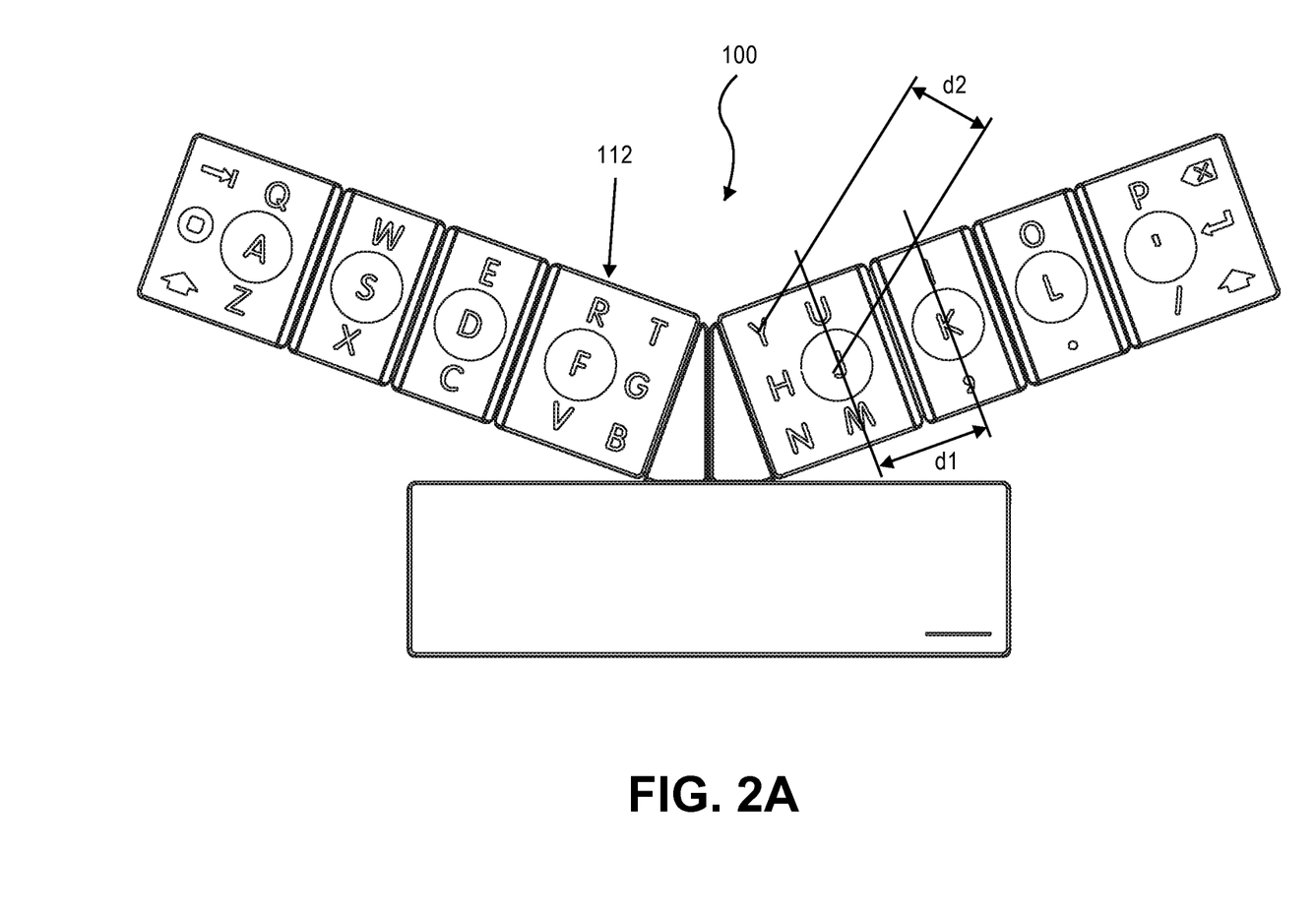
FIG. 2A depicts the keyboard of FIG. 1 showing only the functions accessible at a first layer in one embodiment of the invention.
Figure 2B:
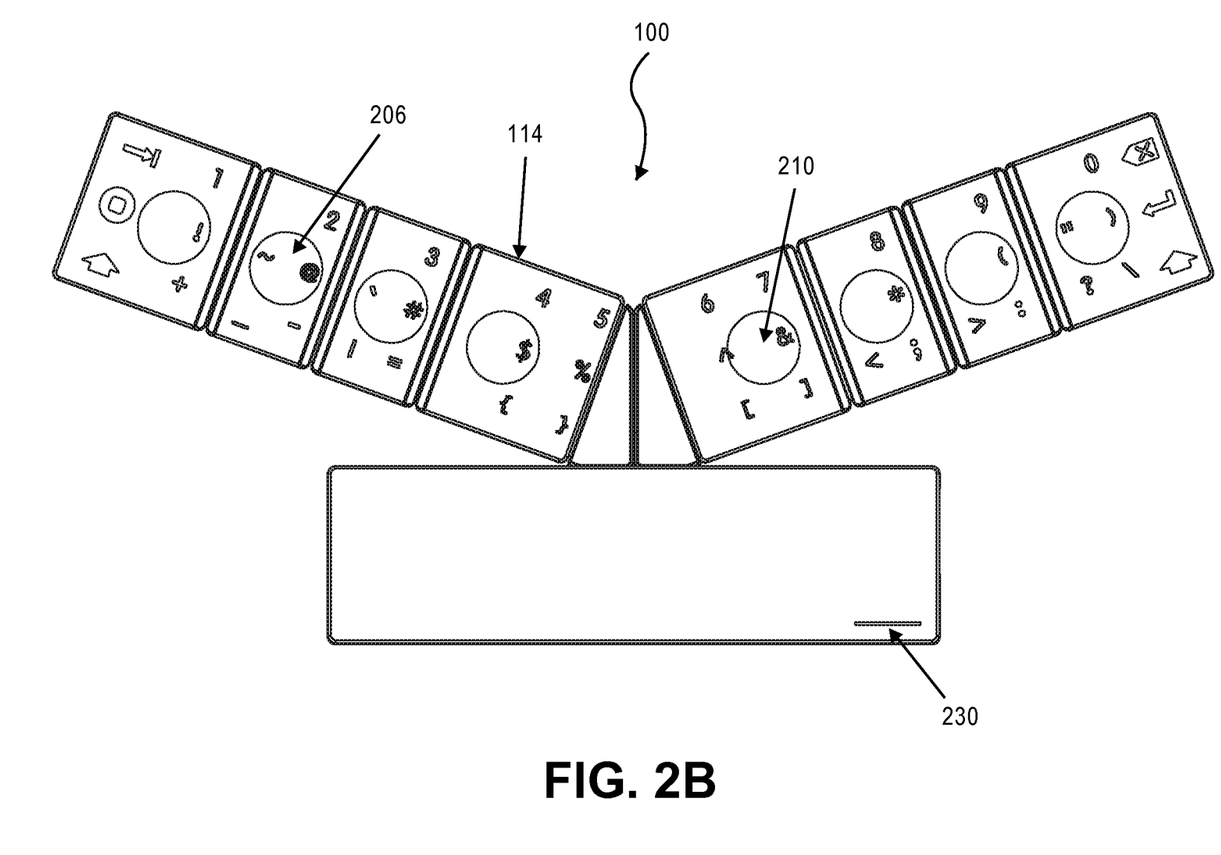
FIG. 2B depicts the keyboard of FIG. 1 showing only the functions accessible at a second layer in one embodiment of the invention.

Keyboard 100 includes a spacebar module 102, a right hand key array 104 and a left hand key array 106. Spacebar module 102 provides space bar functions to the keyboard. The spacebar module 102 also provides the "command" function that is commonly available on existing keyboards. In one embodiment, the command function is selected by actuating a region on the Spacebar module 102 located near the "Command" legend 130. For example, concurrently pressing command and P is a print command for Apple® computers. Other special keys from PC keyboards, such as control, alt, option, Fn, and the "Windows Command" key, may also be supported. This can be provided through a combination of regions mapped to these functions, and/or sequential, temporal or location-based gestures. For example, double-tapping the command legend can be interpreted as the control key. In one embodiment, a controller within the keyboard 100 can detect the type of host system, such as an Apple iPhone, or a Windows PC, and automatically map the required functions to support that specific host. Right hand key array 104 includes four distinct mechanical keys that are collectively mapped to all the alphanumeric functions typically accessed by the right hand of the user on a touch-type keyboard, in this example a QWERTY layout keyboard. A left hand key array 106 similarly maps to all of the alphanumeric functions typically accessed by the left hand of a user. The letters (alpha characters) form the majority of the first layer (details of the first layer are depicted in FIG. 2A). Less commonly used characters are efficiently distributed as shown. In one embodiment, most of these functions are distributed to be accessed by a same finger as would be the case on a conventional keyboard. The numbers and these less commonly used characters form the second layer of functions associate with location on the keyboard (details of the second layer are depicted in FIG. 2B).

Figure 2C:
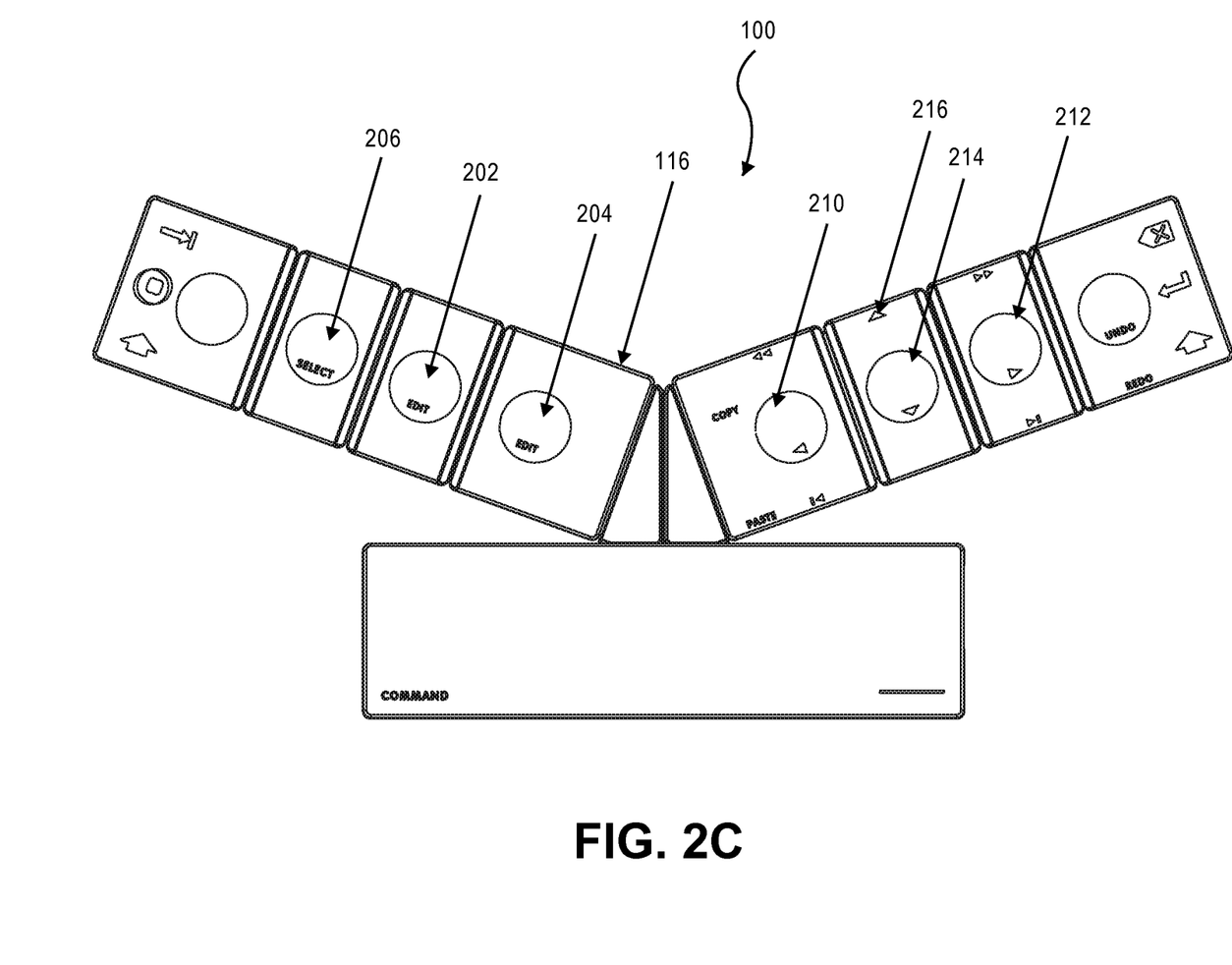
FIG. 2C depicts the keyboard of FIG. 1 showing only the functions accessible at a third layer in one embodiment of the invention.

Additionally, cursor control and special functions are provided by the keyboard 100 at a third layer (details of the third layer are depicted in FIG. 2C). To permit a user to visually identify the functions on the keyboard both in the context of hunt-and-peck typing, and the context of lesser-used functions where even touch typists require visual confirmation, all three layers of functions should be represented at their locations on the keyboard 100. It is desirable for each layer to be represented differently to distinguish between layers. Additionally, it has been found that many different colors on a single key become "busy" and actually make finding the functions more difficult. To facilitate identification at different layers, layer one functions 112 are represented in a first color. For example layer one functions 112 may be represented in white or silver ink on a black or grey plastic key. The second layer functions 114 are represented in a second color. For example, layer two functions may be represented in metallic green or metallic blue ink on the grey or black key surface. In some embodiments, the second layer functions 114 may be represented in a smaller font than the first layer functions 112. Finally, the layer three functions 116 may be represented in the same color as the underlying key by blind-embossing (i.e. engraved) or molding the keys so these functions 116 are represented as raised indicia on the key. By having only two distinct colors of ink, finding the three layers of functions is easier for most users than a tricolor, busier indicia schema.

Keyboard 100 defines a set of home row locations, one for each finger. Thus, in a QWERTY style keyboard, key array 106 has the home row location defined at the "A" location, the "S" location, the "D" location and the "F" location. The right hand key array 104 has home row locations defined at the "J", "K", "L", and the apostrophe locations. This represents a repositioning of the apostrophe location to the home row instead of the ";". But in usage today the apostrophe has higher usage than semi colon and colon and is therefore more desirable to be placed on the home row in the first layer 112. In one embodiment, a rounded well 122 defines each home row location. The rounded concave well 122 provides easy tactile identification of the home row location on the key surface for a user. Other embodiments of the invention may use some other tactile indication such as a roughened area, a raised area, or other tactilely-discernible feature that permits a user to locate the home row without looking. It is believed that some tactile indication of location is highly desirable for touch-typing.

As noted above, to compactly provide all of the functions of a standard keyboard as well as some other desirable functionality, keyboard 100 provides at least three distinct layers of functions at some locations on the keyboard. The alphabetic characters 112 exist at one layer, numbers 114 as well as special characters exist at a second layer 114, while cursor control functions and some other special functions exist at third layer 116. For example, the "K" location provides capital K and lowercase k in layer 112, an "*" in layer 114, and a down arrow function in third layer 116. The functions on the left edge 140 (tab, caps lock, and shift) and the right edge 142 (back space/delete, return, and shift) are available at all layers in one embodiment. In one embodiment the keyboard permits concurrent actuation of a letter location, and a second location, e.g. the shift location, on the same physical key. The layers are explained in greater detail with reference to FIGS. 2A-C below.

FIGS. 2A-C depict the keyboard of FIG. 1 with only a first, second and third layers of functions respectively visible. FIG. 2A shows the functions accessible at a first layer 112. This includes all of the alphabetic characters, the shift function, the caps lock function, the tab function, the delete function, the return function, the apostrophe, the backslash, period and comma. In one embodiment, the double quote grammatical symbol, the "?", "<" and ">" are also first layer 112 functions accessible as a shift of the apostrophe, "/" "," and "." locations respectively. The shift may be the "up-shift" arrow depicted in the outer lower corners of the keyboard, or other function key shifts that may be provided as desired, such as the command key or related keys described above. In such embodiments these symbols are represented on the key surface in the layer one 112 color e.g. silver. Such an embodiment may be used to increase consistency with existing standard keyboards. In other embodiments these symbols form part of layer two 114 as shown in FIG. 2B. Where the symbol is not accessible in the first layer 112 it would be shown on the surface of the key in the layer two 114 color e.g. green. In normal operation, when in the layer two 114 state, all of these characters are accessible uniquely with a single key press by a finger at the location of the corresponding indicia on the key surface. Capacitive sensors within the keyboard detect the location of the user's finger on the key surface so that the key press is uniquely identified as corresponding to the desired function.

Among the problems that arise with many compact keyboards is the individual keys become too small for effective touch-typing. This is especially true for compact mobile keyboards. By aggregating multiple letters onto keys that are actually larger than standard keys, the spacing between fingers in the home row position can be maintained in a desirable range for touch-typing. For example, the spacing $d_1$ between adjacent home row positions for one hand is greater than 14 mm and preferably in the range of 17 mm to 22 mm. When discussing "distances" herein, the distance between two locations is defined as the center-to-center distance. That is the distance from the center of one location to the center of the other location.

Notably, in the arrangement of keyboard 100, all alphanumeric characters to be accessed by a particular finger during touch typing (1) reside on the same key and (2) occupy a location immediately adjacent to the home row location. As used here in "immediately adjacent" when modifying location means there is no location (for another character) between a location and its immediately adjacent neighbor location. All immediately adjacent locations on a key are closer to the corresponding home row location than that home row location is to any other home row location. The distance $d_2$, that is the distance between a home row location and an adjacent location, will be in the range of 7 mm to 18 mm, but $d_2$ is always less than $d_1$, where $d_2$ is defined as the distance between a home row Location and any of its immediately adjacent locations on the same key, and $d_1$ is defined as the distance between any two immediately adjacent home row locations to be operated by a single hand during touch-typing. It is desirable that $d_1$ always be at least 10% greater than $d_1$ for every $d_1$ and $d_2$. As a general matter, the distance $d_2$ between J and Y, or J and N, or F and T, and F and B will be the greatest throw (distance between immediately adjacent locations on any key) required to access any function. Testing has shown that the reduced throw coupled with the desirable finger spacing between adjacent finger locations on the home row increases the speed of touch-typing.

FIG. 2B depicts the keyboard of FIG. 1 showing only the functions accessible at a second layer in one embodiment of the invention. In one embodiment, layer two 114 functions are accessed via a selection function 230 on the spacebar module. The line in location 230 on the spacebar module 102 is, in one embodiment, instantiated in the same color (e.g. green) as the layer two functions on the other key arrays 104, 106. In one embodiment, actuation of location 230 on the space bar module 102 with a single tap transitions to layer two 114 for the immediately succeeding key event. Tapping location 230 twice in rapid succession latches the keyboard into layer two 114 until the latch is released by, for example, a further actuation of location 230, or a time-out. Alternatively, layer two 114 can be maintained by continuous actuation of location 230. In some embodiments, when the keyboard 100 detects that the user has lifted his fingers off the home row, it may be configured to automatically shift to another layer. For example, if the user moves his hand away to scan the green legends, the keyboard may automatically enter the layer two 114 state for a period of time to allow the user to select a green legend function without pressing a green shift key. If the keyboard detects the return of fingers to home row, the keyboard can be set to automatically return to layer one 112 functionality. Such automatic detection and shifts may also be accomplished by other means such as monitoring keyboard entry data. Modes may be maintained for an unlimited period of time for example, until a certain key input is received.

This layer 114 includes the numbers 0-9, each located to be associated with the same finger that would be used for that number on a standard keyboard. Additionally, the symbols that are the shifts of the numbers are directly accessible in this layer without a shift, and immediately adjacent so as to associate with the same finger as on a standard keyboard. Finally, the lesser-used symbols such as brackets and less common punctuation are distributed in this layer. On the small keys, that is, those keys used by the middle and ring fingers, two symbols may be accessed at one location. This is performed using the normal "up-shift" function, as with shifting between upper and lower case in the alpha layer 112. In the nomenclature of this embodiment, the symbol on the left of the key is the shifted variant, and the symbol on the right is directly accessible without a shift. For example, in this layer 114 the "@" is directly accessible by the ring finger at the home row location 206 without a shift. The "~" is accessible as a shift of that same home row location 206. In one embodiment all of the large keys, i.e. those keys accessed by the index and pinky fingers, have a single layer two 114 function per location, and hence can be accessed without a shift. For example, at layer 114 the "]" can be accessed without a shift by actuating the "M" location, and the "[" can be accessed without a shift by actuating the "N" location, which is below and to the left of the "J" home row location 210. Access to symbols that are commonly used together, such as the brackets, has been found to enhance usability when those symbols can be accessed by the same finger.

The functions of this layer are depicted in a second color different from the characters in the first layer. It is desirable that the second color be less obtrusive than the first color. In one embodiment, the functions of this layer are depicted in metallic green ink. Testing has shown that metallic green ink (such as Pantone 10316C) performed best in bright and dim ambient light conditions to provide both good visibility in low light as well as sufficient subtlety relative to the alphabet color when viewed in bright light. Other embodiments may use other inks, such as Pantones 10317C or 10318C which have also be found to have desirable characteristics.

FIG. 2C shows only the third layer. In one embodiment, the indicia for this layer are blind-embossed on the keys. As such, indicia are molded recesses that have the same color as the underlying plastic of the key. Alternatively, they can be indicia that are raised relative to the surface of the key, and also molded in the same plastic and color. This layer provides special functions such as cursor control functions. Left arrow 210 occupies the home row J location, right arrow 212 occupies the L home row location, down arrow 214 occupies the home row K location and up arrow 216 occupies the I location. Cursor control locations 210-216 form a typical inverted-T cursor control pattern familiar to users. Significantly, however, because the cursor control is embedded in the home row, it is faster and more convenient to access. As is described below, the "edit" locations 202 and 204 occupy the D and F home row locations, and permit access to this layer 116 and in particular to the embedded home row cursor control functions 210-216. Similarly, the select function at the S home row location 206 converts the cursor control functions into selection functions. Other useful functions such as copy, paste, undo, redo, go to beginning of line, go to end of line, go to next word, select next word, go to previous word, select previous word, go to next sentence, go to previous sentence, select next sentence, select previous sentence, go to next paragraph, select next paragraph, go to previous paragraph, select previous paragraph, page up, page down, go to start of page, go to end of page, go to start of document, go to end of document, an edit control, a cursor selection control for a zone of text, play, pause, fast forward, rewind, skip forward, skip backward, volume up, volume down, mute, and a media control may be provided at layer three 116.

Table 1 shows one possible mapping of layer three 116 functions with the activating key combinations:

TABLE 1

|  | EDIT (Move position of edit cursor) | SELECTION (Move cursor and grow/shrink selection zone . . . ) | AUDIO (Adjust audio/video playback.) |
| --- | --- | --- | --- |
| Locations to actuate concurrently to enter this state Location | D, F | S, F, D | A, S, F, D |
| J ◀ | Move cursor left one character | . . . by one character to the left. | Pause. |
| L ▶ | Move cursor right one character | . . . by one character to the right. | Play/Pause toggle. |
| I ▲ | Move cursor up one line | . . . by the line above. | Volume up |
| K ▼ | Move cursor down one line | . . . by the line below. | Volume down |
| U ⏪ | Jump cursor one word to the left (or by one sentence in some apps) | . . . by one word to the left (or by one sentence in some apps) | Rewind |
| O ⏩ | Jump cursor one word to the right (or by one sentence in some apps) | . . . by one word to the right (or by one sentence in some apps) | Fast forward |
| M ｜◀ | Jump to the beginning of line (or paragraph in some apps) | . . . to include the beginning of the line (or paragraph in some apps) | Previous Track |
| . ｜▶ | Jump to end of line (or paragraph in some apps) | . . . to include the end of the line (or paragraph in some apps) | Next Track |

The first row of Table 1 shows the location combination that allows the user to access that functionality. The first column shows the layer one locations in correspondence with the layer three functions symbol. The remainder of the table sets forth the function associated with the particular symbol in different states of layer three 116 operation. Accessing the layer three 116 functions is discussed in more detail with reference to FIGS. 3 and 4 below.

Figure 3:
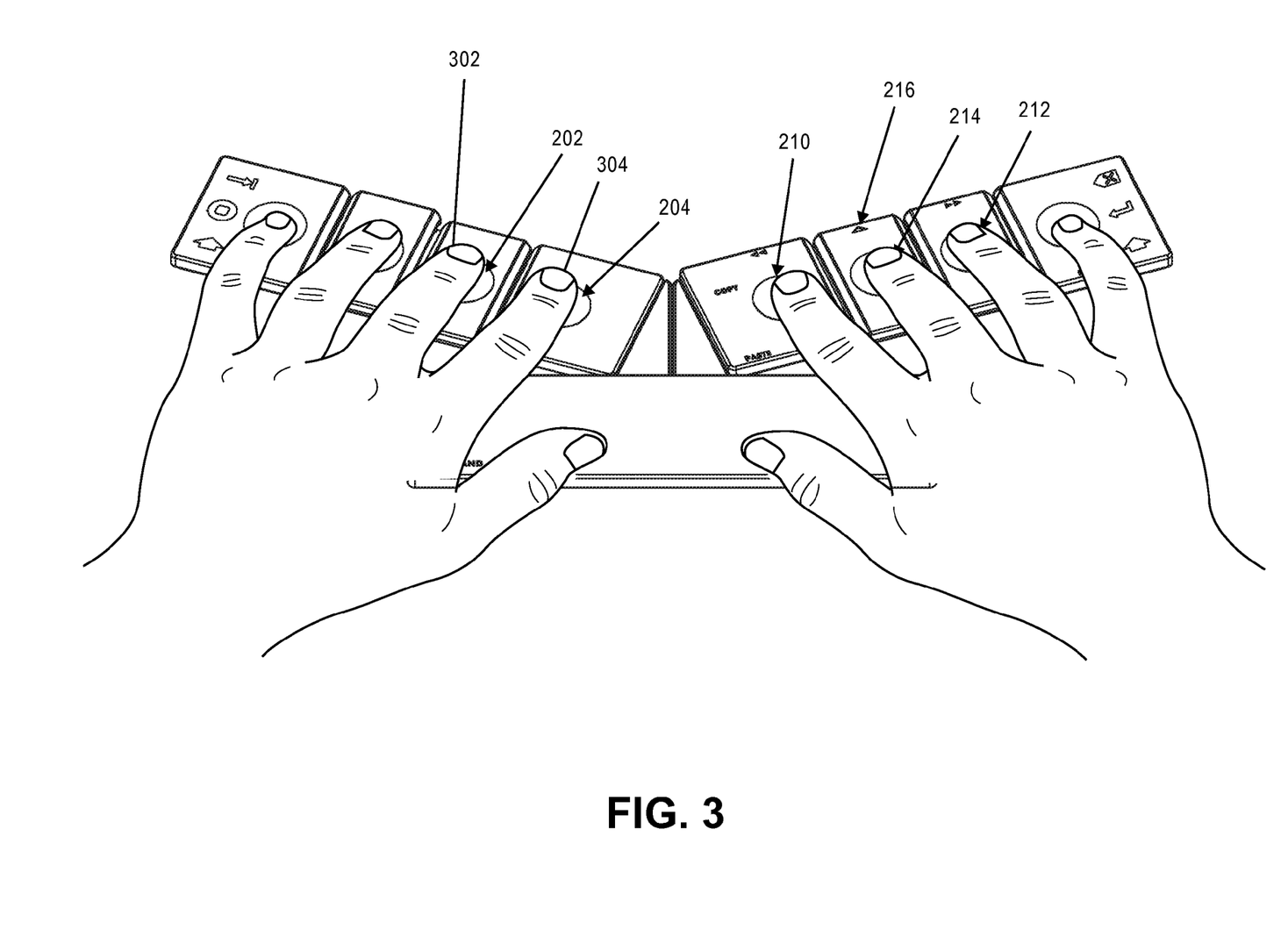
FIG. 3 depicts a user activating the third layer functions.

FIG. 3 depicts a user activating the third layer functions. When the home row "edit" locations 202 and 204 are concurrently actuated, a processor within the keyboard identifies this as a signal to switch to the third layer functions. Thus, by concurrently actuating two home row locations, three other home row locations and the "I" location are converted to cursor control functions. Because of the tactile features (wells 122) and the adjacency of other locations, this provides a fast and efficient swap between alpha characters and cursor control. Moreover, it can all be done without looking at the keyboard. It is not of course mandatory that the concurrent actuation of locations for switching modes both be on home row. However, having one location on home row provides an anchor. Thus, it is within the scope and contemplation of the invention that the switch to cursor mode could be performed by concurrently actuating e.g. location 202 and the location immediately below, above or otherwise adjacent to 204. Such would be deemed to be within the scope and contemplation of the invention.

However, it is deemed to be fundamentally different where a user must leave the home row completely to instigate the change. The risk of error and the coincident requirement of visual confirmation renders combinations of locations exclusive of home row less desirable for providing the touch-type transition without requiring visual confirmation. In this example, index finger 304 actuates location 204 and middle finger 302 actuates location 202 allowing a right hand index, middle and ring finger to access cursor control functions 210-216 directly while anchored on the home row. In one embodiment, the other functions at layer three 116 such as cut and paste are also enabled by the concurrent actuation of locations 202 and 204. It is within the scope of the invention to swap the triggering array with the cursor control array. For example one embodiment of the invention may use the J location and the K location to enter cursor control mode and use the S, D, F and E locations as the inverted T cursor control. Left-handed users may prefer this arrangement. In one embodiment a firmware toggle permits such a swap. For purposes of this invention, concurrent actuation shall mean overlapping in time. In order to determine the start and finish of a key actuation at one location relative to another, a controller within the keyboard 100 can apply a timestamp to each key event. In this way, the controller can determine which key event occurred first, and how long the gap in time was between a first and second key event constituting a concurrently overlapping pair. These timestamps may be used after the physical key event has occurred, but before reporting the resultant determination to the host. In this way, very high time and sequence precision can be achieved.

In one embodiment, the keyboard remains at the third layer only so long as both triggering locations (here 202, 204) are actuated concurrently. In an alternative embodiment, after the keys have been actuated concurrently, the mode is latched within a processor in the keyboard, and the keyboard remains at layer three 116 until triggered to leave that state. In one embodiment, the trigger to leave the mode and e.g. return to layer one 112 (the alpha characters), may be the next concurrent actuation of the triggering locations (here 202, 204). Thus, the concurrent actuation of these locations acts as a toggle between the cursor control mode and the alpha mode. Alternatively, one concurrent actuation of the trigger locations could modify only the next key struck. It is within the scope of the invention to allow for concurrent actuation of the triggering locations (here 202, 204) at the same time as the key that is modified by switching layers. Exiting layer three 116 may also be triggered after a defined time period where none of the triggering locations (here 202, 204) are pressed. Combinations of these options are also possible. For example, one embodiment may alternatively remain in layer three 116 mode while the keys are concurrently actuated, but also respond to a momentary actuation by latching the mode for a single immediately following actuation.

In some embodiments, actuation of an additional location converts the third layer keys to an audio control state. For example, in one embodiment concurrently actuating all four left hand home row locations (A, S, D, F) converts the third layer keys to audio controls. In some embodiments, "audio" may be blind-embossed in association with the "A" location. In some embodiments, audio control may be entered by concurrently actuating the "A" location with only one or two other locations on the keyboard. The Audio control state may also be latched, exited, or otherwise toggled as described above.

In an alternative embodiment, holding down a single home row location, e.g. location 202 with the left hand, causes actuations of other locations to be interpreted as actuation of a layer three 116 function. By way of example, concurrent actuation of location 202 by the left hand, and 214 by the right hand, would result in a down arrow function in this alternative embodiment, however care must be taken to avoid confusion with intentionally distinct keyboard "rollover" events.

Figure 4:
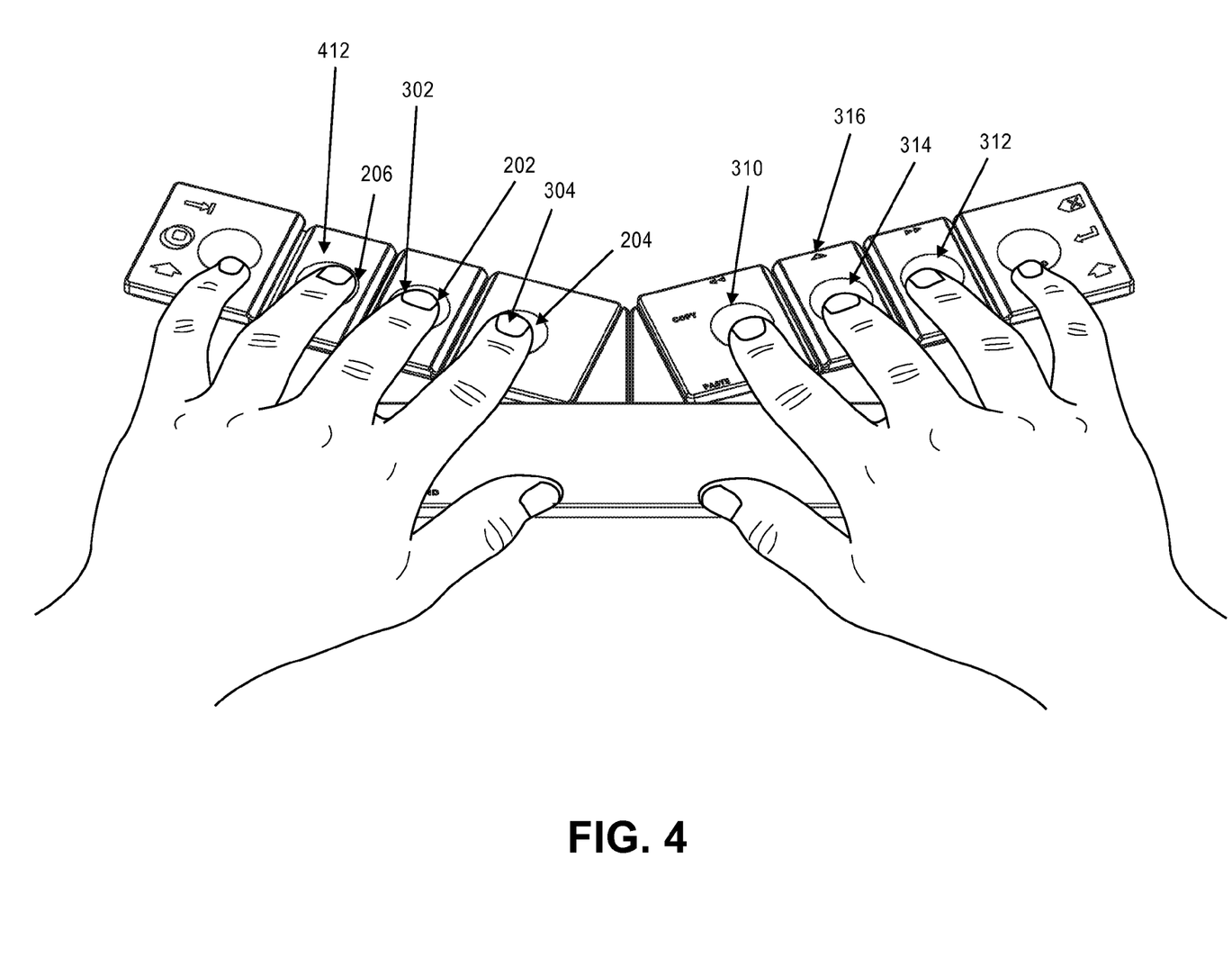
FIG. 4 depicts actuation of the selection cursor functions according to one embodiment of the invention.

FIG. 4 depicts actuation of the selection cursor ("select" cursor) functions according to one embodiment of the invention. To convert from standard cursor functions to "select" cursor function, in one embodiment of the invention, the ring finger 412 actuates the home row location 206 concurrently with the actuation of home row locations 202 and 204 by middle finger 302 and index finger 304. In another embodiment of the invention the location actuated to convert to select cursor function may not be on the home row. When in the select state, the cursor jumps to the next block of text (a character, word, line, paragraph etc., as the case may be), and automatically highlights the entire block of text for a desired operation. Cursor control functions 310-316, and the others shown for example in Table 1, act to select a defined text block to permit for example, copy and paste functions. Similarly, with the select function it may remain active only while all three locations 206, 202 and 204 are concurrently actuated, or it may be latched by the initial concurrent actuation of the three locations 202-206. In the latched case, concurrent reactuation of the three locations 202, 204, 206 may be used to exit the selection state. Each of the cursor and selection functions may also be assigned to other functions outside the context of text processing applications, such as navigation and selection of thumbnail images or application icons. It is within the scope of the current invention to create an application that responds to inputs from the keys on layer three 116 in the manner contemplated above. It is also within the contemplated scope of this invention that selections marked with this layer three functionality may persist on the host device or application after completing a selection, even after exiting the selection state or leaving layer three.

Figure 5:
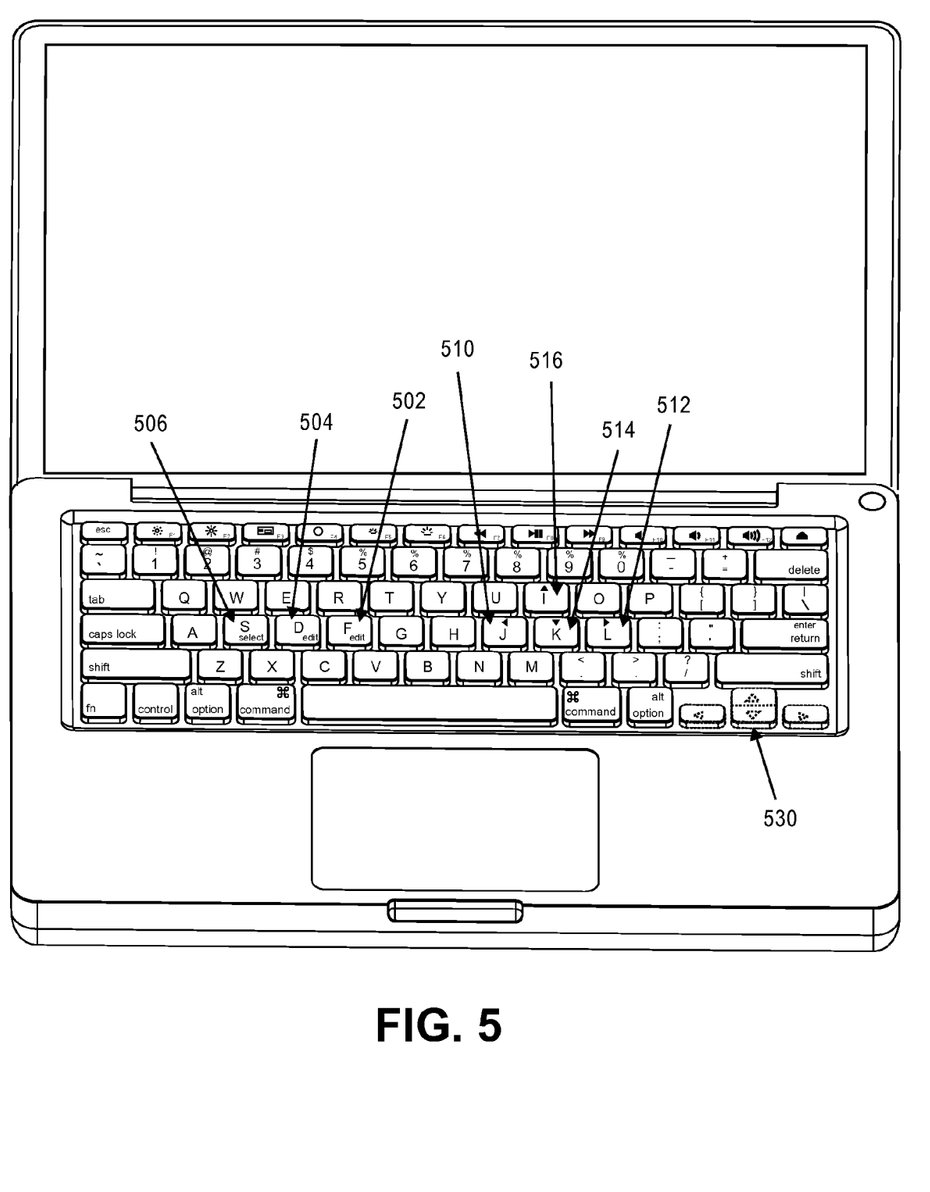
FIG. 5 is a diagram of one embodiment of the invention incorporated into a laptop computer.

FIG. 5 is a diagram of one embodiment of the invention incorporated on a laptop computer. In one embodiment, the D key 504 and the F key 502 are mapped to the "edit" function such that the concurrent actuation of keys 502 and 504 causes the J, K, L, and I keys (510, 514, 512, 516) to be remapped to the inverted-T cursor control keys. This allows for the elimination of dedicated cursor control keys 530 typical on today's laptop computers. Additionally, it allows efficient reduced-motion access to cursor controls on other standard touch type keyboards. In one embodiment, this remapping is performed by firmware resident within the laptop. In other embodiments, the remapping is performed by one of the operating system (O/S), a keyboard device driver, or a software application installed on the O/S. While the laptop is used as an example, this functionality would be useful with standard keyboards used with desktop computers as well as any small mobile device with integrated touch type keyboards such as notebooks, netbooks, tablet case or cover keyboards, etc. In one embodiment, the keyboard 100 described with reference to FIGS. 1-4 above can be wholly integrated into a laptop etc. replacing the standard keyboard such as shown in FIG. 5.

In the foregoing specification, the embodiments of the invention have been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A touch type keyboard comprising:
   an array of tactile keys defining a home row of locations that allow each of 8 fingers to rest concurrently in the course of touch-typing, and providing single stroke access to every letter of a full alphabet through unique locations on the array; and
   a controller that records a timestamp for each of a plurality of key actuation events at different key locations,
   wherein the array of tactile keys comprises mechanical keys, each key having a surface for actuation by a finger and a plurality of capacitive sensors to detect the finger's location on the surface of the key,
   wherein each key surface has a plurality of the unique locations which provides access to all letters on that key, each unique location occupying a defined area of the surface of the key;
   wherein actuation of the mechanical key and detection of the finger's location selects a character at the finger's location;
   wherein the actuation of at least one of the home row locations while actuating a second location, alters a function of a third location in the array to a different keyboard function based, at least in part, on a temporal sequence of the timestamps; and
   wherein the sequence can be evaluated after the events have occurred.

2. The keyboard of claim 1 wherein the concurrent actuation of at least two locations maintains the altered function of the third location only during the concurrent actuation.

3. The keyboard of claim 1 wherein the concurrent actuation of at least two locations activates a latched state which maintains the altered function of the third location for some period after the concurrent actuation.

4. The keyboard of claim 1 wherein the second location and the third location having the altered function are the same location.

5. The keyboard of claim 1 wherein an alphabetic function location is altered to a cursor key function at a same location.

6. The keyboard of claim 5 wherein a set of cursor key functions is arranged in an inverted T pattern of locations.

7. A touch type keyboard comprising:
   an array of tactile keys defining a home row of locations that allow each of 8 fingers to rest concurrently in the course of touch-typing, and providing single stroke access to every letter of a full alphabet through unique locations on the array; and
   a controller that measures an amount of time between actuation events at two different key locations;
   wherein the array of tactile keys comprises mechanical keys, each key having a surface for actuation by a finger and a plurality of capacitive sensors to detect the finger's location on the surface of the key,
   wherein each key surface has a plurality of the unique locations which provides access to all letters on that key, each unique location occupying a defined area of the surface of the key;
   wherein actuation of the mechanical key and detection of the finger's location selects a character at the finger's location;
   wherein the actuation of at least one of the home row locations while actuating a second location, alters a function of a third location in the array to a different keyboard function based, at least in part, on the time measured,
   wherein an alphabetic function location is altered to a cursor key function at a same location,
   a set of cursor key functions is arranged in an inverted T pattern of locations, and
   wherein the inverted T pattern overlays the cursor function up with an 'I' location, down with a "K" location, right with an "L" location and left with a "J" location.

8. The keyboard of claim 5 wherein actuating an additional location on the array while operating a cursor key produces a cursor function that allows selection of a range of text.

9. The keyboard of claim 1 wherein the altered function is at least one of copy, paste, undo, redo, go to beginning of line, go to end of line, go to next word, select next word go to previous word, select previous word, go to next sentence, go to previous sentence, select next sentence, select previous sentence, go to next paragraph, select next paragraph, go to previous paragraph, select previous paragraph, page up, page down, go to start of page, go to end of page, go to start of document, go to end of document, an edit control, a cursor selection control for a zone of text, play, pause, fast forward, rewind, skip forward, skip backward, volume up, volume down, mute, and a media control.

10. The keyboard of claim 1 wherein numeric functions are associated with a same finger used on a typewriter keyboard.

11. The keyboard of claim 10 wherein symbol functions associated with number keys are associated with a same finger used on at least one of a QWERTY or AZERTY typewriter keyboard.

12. The keyboard of claim 1 integrated with a computer having a display.

13. A touch type keyboard comprising:
   an array of mechanical keys, each key having a surface for actuation by a finger and a plurality of capacitive sensors to detect the finger's location on the surface of the key, the array defining a home row and a rest location for each of eight fingers on the home row;
   wherein each key surface has a plurality of discrete locations which provide access to all characters on that key, each discrete location occupying a defined area of the surface of the key;
   the array having discrete locations corresponding to all the letters of an alphabet and all numbers 0 through 9;
   wherein actuation of the mechanical key and detection of the finger's location selects a character at the finger's location;

wherein all alphanumeric characters are accessible from the rest locations on the home row, or an immediately adjacent discrete location;

and wherein a distance between adjacent finger rest locations is greater than a distance between a finger rest location and any alphanumeric character location associated with that same finger;

wherein the distance between any two locations is defined as the center to center distance.

14. The keyboard of claim 13 wherein the distance between adjacent finger rest locations is at least 10% greater than a distance between a finger rest location and any alphanumeric character location associated with that same finger.

15. The keyboard of claim 13 wherein the distance between a finger rest location and any other alphanumeric character location associated with that same finger, is between 7 mm and 18 mm.

16. The keyboard of claim 13 wherein the distance between adjacent finger rest locations is greater than 14 mm.

17. The keyboard of claim 13 wherein all symbol characters present on at least one of a QWERTY or AZERTY keyboard are accessible from the rest locations on the home row, or an immediately adjacent discrete location.

18. The keyboard of claim 13 wherein the keys provide a tactile feel.

19. The keyboard of claim 13 integrated into a computer having a display.

20. A touch type keyboard comprising:

an array of tactile keys defining a home row and a rest location for each of eight fingers on the home row;

wherein the array of tactile keys comprises mechanical keys, each key having a surface for actuation by a finger and a plurality of capacitive sensors for detecting the finger's location on the surface of the key, wherein each key surface has a plurality of discrete locations which provide access to all characters on that key, each discrete location occupying a defined area of the surface of the key;

wherein actuation of the mechanical key and detection of the finger's location selects a character at the finger's location;

the array having discrete locations corresponding to all the letters of an alphabet and all numbers 0 through 9;

wherein multiple functions reside at a same location; and wherein at least one location has at least three layers of functions;

wherein indicia for a first layer of alphabet functions is in a first color different from a background color, wherein at least one other layer of functions is distinguished by at least one of dimensionally engraved or raised markings that are not colored differently from the background wherein indicia for three layers of functions are permanently marked on a physical surface of the tactile keys.

21. The keyboard of claim 20 wherein at least one layer is distinguished by indicia of a different color than both the indicia corresponding to a first layer and the background color.

22. The keyboard of claim 20 wherein at least one layer is distinguished by indicia of a different scale than the markings on the first layer.

23. The keyboard of claim 20 integrated into a computer having a display.

* * * * *